Patented Apr. 7, 1942

2,278,471

UNITED STATES PATENT OFFICE 2,278,471

COCOA NIB

Albert Musher, New York, N. Y., assignor, by mesne assignments, to Food Manufacturing Corporation, Chicago, Ill., a corporation of New York No Drawing. Application July 21, 1939, Serial No. 285,665

4 Claims. (Cl. 99—23)

The present invention relates to cocoa nibs and particularly it relates to cocoa, chocolate, and cocoa butter made therefrom so that these materials may be more economically and better prepared, or so as to have entirely new qualities not heretofore possible.

In view of the fact that cocoa nibs are generally roasted for relatively long periods of time as, for instance, from 30 minutes to 2 hours, at comparatively low temperatures as, for instance, from about 212° F. to about 284° F., obviously there is a length of time involved before the heat spreads to the interior portions and to the centers of the cocoa nibs. This delay in heat penetration is further influenced by the character and hardness of the cocoa nibs.

Therefore, in view of the fact that the heat is delayed in reaching the interior portions, complete uniformity in the roasting treatment is not obtained in view of the fact that the exterior portions of the cocoa nibs are roasted or heat-treated first, and the heat penetrates to the inner portion only gradually thereafter.

Likewise, in the various processes for cooling the nibs after they are roasted, as, for instance, by the use of air blasts, it obviously takes longer for these cooling procedures to affect the interior portions of the cocoa nibs than it does to affect the outer portions. This is because the cooling procedure starts from without and only gradually goes into the inner portions. In this way, the heat of the nibs throughout the entire structure is not stopped immediately, as it is desired to do.

Also, in the roasting procedure, a considerable amount of time is involved. An economical method for reducing this time has heretofore not been found.

Heretofore, also, the cocoa nibs have been roasted with substantially all of the fat contained therein, and obviously, with the long roasting procedure that is necessary, the quality of the fat is harmed so that, when it is removed from the nib, it is not of the highest keeping quality as it is in its natural condition in the unroasted nib.

It is therefore among the objects of this present invention to provide an improved cocoa nib and improved cocoa butter, chocolate, and cocoa resulting therefrom with various advantages as, for instance, lower cost, better quality, and so forth.

A further object of this invention is to provide a method whereby the cocoa nibs may receive a substantially more uniform roasting treatment, and also, where the heat of roasting will pass substantially quickly into the interior portions of the nib and thereby produce relatively the same roasting conditions within the nib as on the outside of the nib.

It is still further an object of this invention to provide cocoa nibs in a condition whereby they may be more readily and more uniformly cooled so that the cooling of these nibs after roasting may take place substantially more quickly than heretofore possible.

Another object is to provide powdered cocoa with new physical characteristics that will show enhanced suspension-quality when cocoa or chocolate drinks are produced therefrom, and which will also show more readily absorbent quality, and improved intensity and quality of flavor.

A still further object of the present invention is to provide cocoa butter which may now be produced with substantially better keeping qualities and other substantially improved characteristics.

Also, it is an object of this invention to provide an improved procedure for extracting the fat from cocoa nibs.

Still further objects and advantages will appear from the more detailed description set forth below, it being understood, however, that this more detailed description is given by way of illustration and explanation only, and not by way of limitation, since various changes therein may be made by those skilled in the art without departing from the scope and spirit of the present invention.

It has now been found that the above objects may be accomplished by subjecting the cocoa nib, either before, after, or both before and after roasting, to an expansion or explosion procedure whereby the cell or body structure of the cocoa nibs may be ruptured, or otherwise disrupted so as to provide openings, crevices, or passages, or so as to provide an expanded or relatively porous nib so as thereby to enable air, moisture, steam, or various solvent materials to more readily enter into or penetrate within the structure of the nib, or so as to enable the more ready extraction of materials therefrom, and so forth.

In conjunction with this explosion procedure various accessory procedures may be utilized either alone, or in combination with each other so as to produce entirely new and enhanced qualities. These accessory procedures for example may consist of freezing, steaming, boiling, enzymic action, and starch removal treatments.

While not limiting myself to these specific procedures, a brief summary of some of these possible procedures follow:

1. The cocoa nibs are exploded one or more times, and then a quantity of the fat is removed therefrom. The cocoa nibs are then roasted and cooled. At this point, if desired, the cocoa nibs may be given a further explosion treatment so as to further disrupt them or so as to further enable an enhanced fat removal procedure. The resulting cocoa nibs are then ground so as to produce the additional fat separation and also so as to separate the cocoa therefrom.

2. The cocoa nibs are exploded, and then are roasted and cooled. If desired, the explosion may take place both before and after the roasting, or it may take place either before or after the roasting. The remaining cocoa nibs are then ground so as to remove an amount of fat therefrom, which procedure may be enhanced by the use of hot water.

3. The cocoa nibs are cooked, or steamed, or they are otherwise treated as, for instance, by a combination of cooking, steaming, and then slow freezing them, so as to rupture the cells therein. The nibs are then dried to a moisture content ranging between 7% and 10% for instance, and then are exploded. The water treatment with the cooking and/or freezing may take place after the explosion instead of before the explosion. Following this, the fat removal and separation of the cocoa is effected.

4. In conjunction with the various treatments hereinabove briefly summarized, and at various stages therein, and particularly in many cases after the cocoa nibs have been exploded, they may be treated with an enzyme so as to convert the starch therein into a non-starchy material which may then be removed therefrom.

5. In any of the procedures hereinabove described, and at various points therein, and particularly after explosion, the starch may be reduced by soaking or washing with water, or by the use of various other methods, solvents, or washing materials.

6. In the procedures hereinabove described, multiple explosion, which consists of exploding the nibs more than one time, is quite an important possible embodiment in view of the generally hard nature of the nib.

7. After the nibs have been exploded and while they are still in their relatively whole condition, solvents such as carbon bisulphide, etc. may be used to penetrate into the more opened structure of the nibs so as thereby to aid in the removal of the fat therefrom.

In carrying out this invention, the cocoa nibs, which generally have a moisture content under 10% to 15%, are subjected to a treatment at a relatively elevated temperature and pressure. For best results the pressure should be above 20 or 25 pounds per square inch, and generally, it should be above 40 to 50 pounds per square inch, and in some cases it may run as high as 350 pounds, 450 pounds, or more, per square inch.

Generally the temperature should be above 200° F. to 250° F. and it may run, if desired, over 700° F. to 750° F. A general range, however, is usually between 400° F. and 600° F.

This explosion treatment is carried on for a period of time and at a pressure and temperature depending upon a number of factors as, for instance, the moisture present within the cocoa nibs, the degree of expansion desired, the type of equipment used, whether the nibs are raw or whether they are partially or wholly roasted, whether dry heat or steam or superheated steam is used for the expansion chamber, etc. Also, the explosion treatment will depend upon the time, temperature, and pressure conditions themselves, and also upon other factors.

The required time for exposure to these temperatures and pressures may be, for instance, 18 to 20 minutes or longer, or it may be under 10 minutes, or less than several minutes, whereas in many cases it may be under one minute. and in many cases several seconds or 15 to 45 seconds will suffice to produce the treatment and give the best result.

If the cocoa nibs that are to be exploded are a little too dry for the required explosion, additional moisture may be added to them or to the expanding chamber, as, for example, in the form of water or other aqueous material, or in the form of steam, or superheated steam. Likewise, if desired, the cocoa nibs may be steamed, or cooked, either at atmospheric pressure, or under vacuum or pressure, so as to get additional moisture into the nibs, or so as to give them some softening if this is desired.

For this expansion or explosion procedure however, the nibs should generally have a moisture content below 20% or 25% and generally below 10% to 15%.

If, because of prior treatment, or otherwise, there is too much moisture in the nibs to enable the required explosion, this additional moisture should be removed, prior to the explosion, by various drying or dehydration methods such as, for instance, by air drying, dry heat, oil roasting, dry roasting, boiling in oil, or by various other methods.

The explosion or expansion treatment in one of its generally preferred embodiments is carried out in a steam atmosphere, and this steam may be developed by various methods as, for instance, from the moisture within the cocoa nibs that are being processed, or by injection of steam into the pressure chamber, etc. This steam may be controlled so as to maintain or change the moisture content of the nibs being treated and thereby so as to obtain the best results. Any moisture that is added may consist of or include various fruit, vegetable, or meat juice, or of other flavoring materials such as vanilla, spices, etc.

After this treatment at an elevated temperature and pressure, the cocoa nibs are suddenly and instantaneously released to atmospheric pressure, and temperature, or to substantially lower temperatures and pressures, as, for instance, by opening the particular vessel in which the cocoa nibs have been treated which vessel may be in the form of a pressure gun or chamber, or some other suitable apparatus.

After the cocoa nibs have been treated in accord with the process herein described, it will be found that their structure has been considerably changed and that they are in a condition whereby they have more pores, openings, or other expanded spaces within their body structure. This will permit the easier ingress therein of water, air, steam, heat, and so forth. Also, depending upon the temperatures and pressures that are used, and the other treatments that are given, the cells of the cocoa nibs may be disrupted or broken, so as to permit the exudation of the fat therefrom.

The cocoa nibs, following the explosion or expansion treatment herein described, are then placed into the roasting oven and are roasted. However, it is now found that the heat of the roasting operation enters more quickly and more uniformly into the structure of the entire cocoa nib so as to produce a nib of substantially better quality because of the fact that the inner and outer portions of the nib are processed relatively uniformly throughout as compared with the methods that have heretofore been used.

Also, in view of the fact that the structure of the cocoa nib is now relatively more opened so that the heat of the roasting operation can more readily penetrate within the nib, it is found that the degree of heat that is required and/or the length of time required for the roasting treatment can now be substantially reduced.

Heretofore, the usual roasting temperatures for cocoa nibs have been around 212° F. to 284° F. for periods varying from about 30 minutes to 2 hours. However, it has now been found as herein stated, that, by opening the structure of the cocoa nib, that either the temperature, and particularly that the length of time, or both, may be reduced, and that there will now result under these reduced conditions of time or temperature, the same degree of roasting in the cocoa nib as heretofore resulted with substantially longer periods of time or higher temperatures.

It has been found that by reducing the time periods and/or the temperatures, that considerable improvement results in appearance or quality, or in both.

Immediately after the cocoa nibs are roasted, it is important that they be cooled as quickly as possible so as to stop the roast, and thereby so as to lessen any further damage to the fat therein, and further so as not to burn or over-roast the cocoa nib. Therefore, various cooling procedures are used, as for instance air blasts.

Now, because of the more open nature of the cocoa nibs, the air is better enabled to get into the inner structure of the cocoa nibs and thereby so as to provide a more rapid, more uniform, and more thorough cooling. Also, to retard oxidative development, carbon dioxide or other inert gases may be used instead of air for the cooling purposes.

Still further, by the more quickly roasting procedure that results by the use of this invention, the nibs and the cocoa and fat derived therefrom will retain considerably more or better flavor, in view of the fact that there is not the usual amount of evaporation of the volatile essential flavoring materials, or there is not the degree of decomposition that normally takes place when this period of cooling is extended over lengthened periods of time.

A further advantage of the procedure herein described is that less shrinkage takes place in the cocoa nib due to the quicker roasting procedure and to the quicker cooling procedure that is now possible.

As one of the procedures that may follow after the nibs are cooled, they are ground so as to separate the fat therefrom and so as to produce the powdered cocoa. However, it will be found that the cocoa butter that is produced from nibs treated in accord with this invention are substantially better in quality than cocoa butter as originally produced.

Likewise, it will be found that cocoa produced from the nib treated in accord with this invention is of substantially improved quality in view of its better flavor, and also because of its better ability to produce smoother and more homogeneous cocoa or chocolate drinks when these are prepared therefrom. Apparently a new type of cocoa results from nibs produced in accord with the procedures herein described.

Where required, the exploded cocoa nibs of this invention whether exploded prior to, or after the roasting procedure, may be mixed with a molten hard fat or with a molten sugar so that the sugar, or hard fat, or other protective material, may cover, or preferably, so that it may become impregnated within the structure of the cocoa nib and thereby protect the surfaces or the interior structure of the cocoa nib against loss or change of flavor, and so forth.

Various sugars may be used for this process. For instance it is generally desirable that quickly dissolvable sugars should be used, such as sugars of a more or less non-crystallizable nature as for instance, glucose, honey, levulose, etc. Also, crystallizable sugars may be used such as cane sugar which may be molten, or which may be made into a syrup, and impregnated into the structure of the cocoa nibs.

Also, the fats that may be used should be of an edible nature, and should be either of a plastic or of a hard fat quality. Examples of fats that may be used are hydrogenated cottonseed oil of 105° F. melting point, palm kernel stearin of about 115° F. melting point, etc. Likewise, other fats and oils, and combinations of other fats and oils so as to produce the plastic or hard qualities when congealed, may be used. Also, paraffin, wax, or resins of edible nature, etc., may be mixed with the fat preferably in small proportions, where required.

In the use of a molten plastic or hard fat for impregnating the cocoa nibs, this fat may be congealed in any normal way. However, it is generally preferred to use a quick chilling procedure so as to quickly chill the molten fat within the structure of the cocoa nib and thereby so as to enable a faster and more complete seal of the pores and structure of the nib.

In many cases, also, it is possible and desirable to use for the impregnating or coating material, an emulsion, generally of a water-in-fat type. For instance, glucose syrup of about 40° Baumé may be mixed with a molten hard fat of approximately 110° F. melting point so as to result in an emulsion-like product which will be in the nature of a water-in-fat emulsion. This emulsion may be warmed slightly so as to soften it, and in this condition it may be used to impregnate or coat the exploded cocoa nib.

The production of cocoa nibs in accord with this invention offers new advantages in the protection of flavor, in that it is now possible, because of the relatively structure-opened nature of the cocoa nib, to permit liquid materials to enter within the structure and thereby to drive out at least some of the air that is present, and also so as to coat and protect the interior surfaces as well as the exterior surfaces. This result, as produced under this invention, has heretofore not been possible.

In carrying out this invention, it is at times desirable to subject the cocoa nibs to another explosion treatment as herein described, after they have been roasted. This can be done for the purpose of still further opening the structure of the cocoa nibs, or further disrupting or rupturing the cell or body structure thereof.

In fact, depending upon the characteristics desired in the finished product, the original explosion prior to the roasting may be at higher degrees of temperature and pressure than the explosion that takes place after roasting. Or, if desired, the explosion prior to roasting may be milder than the explosion that takes place after the roasting procedure. The purpose of the explosion prior to the roasting may be to expand the structure of the cocoa nib, and the purpose of the explosion after the roasting may be to disrupt the cell structure thereof to a greater extent.

It is also quite possible as one embodiment of this invention not to explode the cocoa nibs at all prior to the roasting, but to explode them only after the nibs have been roasted. In this case, of course, there will not be the advantages that accrue in the roasting operation, but, after they have been roasted, the cocoa nibs may be subjected to the explosion procedure as herein disclosed, and thereupon, they will be in a structure disrupted, or relatively open or expanded form, so as to permit the improved qualities of the resulting powdered cocoa, etc., that have heretofore not been possible.

In the explosion of the cocoa nibs after the roasting procedure, or prior to the roasting procedure, it is possible, if this is desired, to give the nibs a cooking, but preferably a steaming, at atmospheric conditions, or under vacuum, or pressure, so as to get an additional quantity of moisture into the beans, or so as to soften them somewhat prior to the explosion procedure. Of course, the nibs should be dried to the required moisture content necessary for the proper explosion.

The explosion or expansion procedure as disclosed herein may be used in conjunction with raw cocoa nibs, or in conjunction with cocoa nibs that have been partially roasted, or which have been roasted to various degrees as, for instance, to the extent of a mild roast, a medium roast, or a high roast. The utilization of either raw cocoa nibs, or partially roasted cocoa nibs, or of cocoa nibs which have been roasted in various ways, will result in different types of products when exploded thereafter.

Also, various sequences may be used in the roasting and explosion operation. For instance, the nibs may first be given a mild roast, and then a mild explosion, which may be followed by another roasting operation either with or without steaming, and with dehydration if required, or, another explosion may follow thereafter, either singly, or as multiple explosions. Likewise various other sequences and combinations of the various treatments herein disclosed may be utilized for the specific results desired.

The size, porosity, and other characteristics of the cocoa nibs made under this invention may be controlled by varying such factors as, for instance, the temperature of the expansion treatment, the time of the explosion treatment, and the pressure to which the cocoa nibs are subjected during such explosion treatment.

Also, the conditions to which the cocoa nibs are subsequently subjected upon ejection from the pressure chamber or gun will also control or modify the porosity and characteristics of the nibs. For instance, it is possible to control the expansion, porosity, etc., and to develop variations or new characteristics and qualities in the treated nibs of this invention by ejecting them from the pressure chamber into atmospheres having higher or lower pressures than atmospheric, or into a partial or complete vacuum, or also into various atmospheres which may contain inert gases such as carbon dioxide, nitrogen, or even quantities of oil or aqueous vapors.

Although this procedure of explosion, disruption, or expansion may be carried out in one step, it may be also carried out in a plurality of steps in which case the same, or different temperatures and pressures and time periods may be utilized. For example, the cocoa nibs may be subjected to one or two or three explosion or expansion treatments of a character above described, at temperatures and pressures, and for time periods which may be the same, or which may be greater or less than each other.

In many cases, for instance, a multiple expansion procedure at a lower temperature and/or pressure has advantages over a single explosion at a higher temperature and/or pressure, in view of the fact that there is not the caramelization of the sugars, or other undesired qualities which may be obtained from higher temperatures, but, which would not be obtained from the lower temperatures. At the same time, although each explosion of the multiple process was not sufficient to provide the full expansion required, nevertheless, in the aggregate, the explosions of the multiple procedure would provide the expansion or characteristics required.

It is desirable at times to place a coating on, or within, the cocoa nibs so as to permit the formation of harder walls and thereby so as to result in a greater or more efficient explosion of the product. Starch, resins, gums, sugars, and similar materials may be used to provide such a coating, as, for instance, by mixing these materials with water, or aqueous materials, then coating the cocoa nib, and then allowing to dry thereon.

The cocoa nib treated with the explosion procedure of this invention may be ejected from the pressure chamber, if desired, into oil or molten fat, or into molten sugar, or, as hereinabove disclosed, into fatty or other vapors, or into atmospheres of nitrogen, carbon dioxide or other inert gases, etc. These embodiments may be used to aid in retention of flavors, or in the retarding or elimination of discoloration, off-flavors, etc.

Also, because of the relatively absorbent nature of the exploded cocoa nibs, various types of flavors, or essences, or flavoring materials, may be absorbed into the structure thereof and dried therein, if desired. Likewise, these cocoa nibs may be coated or dusted or impregnated with various preservatives or protectives against deterioration, either in dry form, or mixed with liquid materials.

In some cases, it may be desired to coat the cocoa nibs with a hygroscopic material, or with a material which may tend to harden or cake when it comes into contact with moisture. In these cases, it is of advantage, as one embodiment of this invention, to mix the hygroscopic materials with a water repellent material as for instance, a hydrogenated hard fat of a melting point of 110° F. or 115° F. After the hygroscopic material and the water repellent material have been thoroughly mixed together, then the cocoa nibs are coated with this fat-hygroscopic material mixture which is allowed to harden thereon. The hygroscopic material, which may be of the nature of powdered milk, is held within the congealed water repellent so as to protect the powdered milk against the deterioration of moisture or other deterioration effects.

The invention as herein disclosed may be utilized in conjunction with various other cocoa procedures. For instance, this invention may be used to advantage in the preparation of various cocoa or chocolate extracts or flavors, and in the preparation of quick dissolving or soluble cocoa. Also, this invention is of substantial advantage in removing various elements from the cocoa, or in producing powdered or modified cocoa or chocolate. In fact, this invention offers considerable advantage in any procedure where solvents are used, or where extraction or expression processes are used in conjunction with the cocoa nib, whether these nibs be raw or roasted, or otherwise processed.

For instance, cocoa or the cocoa nib may be made with a substantially reduced quantity of theobromine therein. This procedure for instance may be effected by subjecting the exploded cocoa nib, or even the cocoa powder resulting therefrom, to a solvent extraction procedure with various solvents as, for instance, water, alcohol, and so forth, and thereby so as to remove a partial or substantial amount of the theobromine or other materials therefrom. Because of the relatively structure disrupted condition of the cells therein following the explosion, the extraction of the theobromine and other principles is substantially enhanced.

Along with the extraction of the theobromine, it is possible in many cases that other materials are removed at the same time. Therefore, the solution that has been extracted may be treated so as to inactivate or so as to remove the theobromine and then, the remaining material may be mixed back with the exploded cocoa nibs or with the cocoa powder and dried therein so as to return the desired elements back into the cocoa.

Also the embodiments disclosed in this invention may be utilized in conjunction with various other processes as for instance, freezing, cooking, starch reduction, the use of enzymes, and so forth, in order to produce various results.

As an example of some of these accessory procedures, the cocoa nibs prior to, or after the explosion procedure may be made to absorb water either by cooking, steaming, or otherwise, and then the nib may be subjected to a freezing temperature and preferably to a slow freezing process so as to further soften or disrupt the cell or body structure. The temperature may be graduated, over a period of time, under 32° F., and to a temperature, for instance, between about 0° F. and 25° F., or lower, if required.

Various enzymes may be used and particularly diastatic enzymes may be used so as to soften, predigest, or so as to further disrupt the structure of the cocoa nibs. These enzymes preferably may be used after an explosion procedure so that they may more readily enter into the interior portions of the nib and thereby produce a more uniform and more complete action. For example, the enzyme may be placed into an aqueous medium and the cocoa nibs or cocoa powder placed therein. At the required point, the enzymic action should be stopped by the use of heat or similar procedures.

Generally, the explosion of the cocoa nibs is adjusted so as to have them retain substantially their unity following the explosion. However, where desired, the moisture, temperature and pressure, etc., may be adjusted so as to produce a relatively disunified product.

Another embodiment that is possible with the present invention is that raw cocoa nibs may now be more readily ground or broken or pulverized by first exploding them in accord with the disclosures herein. Heretofore it has been quite difficult to grind raw cocoa nibs due in large measure to their hardness. However, the explosion procedure of this invention produces a quality in the raw cocoa nibs that permits the grinding of these nibs considerably more readily than heretofore possible. After the grinding of the nibs, a roasting, heating, or grinding, or other process may be used as required. Also, the increased ease in explosion of the raw nibs enables enhancement of cocoa butter extraction from the raw nib, and consequently, the production of cocoa butter of substantially better quality.

A still further embodiment that is possible with the present invention is that the starch contained within cocoa beans may be converted into nonstarchy materials, or may be removed to a good extent from the cocoa nibs, by various procedures. This is made possible by exploding the nibs as herein described and then by subjecting the exploded cocoa nibs or the cocoa powder produced from these cocoa nibs to a soaking or to a washing in water or in other liquids, or they may be subjected to an enzymic action as herein described.

However, where desired, the starch may be allowed to remain within the cocoa nib, and, in fact, the explosion procedure as herein disclosed will result in substantial enhancement in the gelatinization of the starch contained therein, so as to produce smoother cocoa and chocolate products.

The explosion procedure of this invention also is of considerable use in loosening the husks or shells that are present on the cocoa nibs, so that they may be more easily removed. In fact, in many explosion procedures and particularly with higher temperatures and pressures, and particularly if the nib is of a relatively dry condition, these husks and shells are practically completely removed by the explosion.

By the utilization of this invention in conjunction with cocoa nibs, it will be found that there will be a substantially enhanced quality in the cocoa butter derived therefrom and also that there will be considerable economy in cost of producing this fat, as well as enabling the extraction of larger portions thereof. This enhanced extraction of the fat from the cocoa nibs is due in large measure to the disruption or breaking of the oil cells contained therein.

In extracting the cocoa butter from the cocoa nibs, the accessory procedures are in many cases advisable. For instance, the exploded material from which the fat is to be extracted may be soaked or boiled in oil or in fat, or in water or an aqueous material. Still further, the freezing operation of this invention is advantageous in enhancing the extraction of fat from the nibs.

By treating the exploded cocoa nibs with hot water, particularly when the water is of a temperature above the melting point of the fat within the nibs, the water is more easily enabled to enter into the structure of the nib, and then, particularly in view of the disrupted structure there is the increased opportunity for the hot water to extract the fat therefrom. This fat may then be allowed to rise to the top of the water and it is removed therefrom.

Likewise, in many cases, it is desirable to use an oil, but particularly a relatively warm or hot oil which may be of a temperature, for instance, ranging between 110° and 135° F. This oil should generally be above the melting point of the cocoa butter contained within the cocoa nibs, so as to better enter within the disrupted structure of the cocoa nib material and so as to better extract the fat therefrom.

Following the water or oil treatment, the resultant cocoa nib may thereafter be pressed, after the exuded portion of the fat has been removed.

If desired, the solvent medium and the exploded nib material may be ground together, or the nib material may be ground prior to the admixture with the solvent. Thereupon, the fat may be pressed, or otherwise extracted or expressed therefrom in order to produce the cocoa butter. For example, the exploded cocoa nib material may be dry-heated, steamed, or treated with hot water, etc., so as to enhance the effecting of this portion of the invention.

The utilization of these water and oil processes in conjunction with the removal of the fat from the cocoa butter produces entirely new and unexpected results in the expression procedures that follow. This is particularly the case in those cases where the exploded cocoa nib material is of a quality that holds or binds the fat within its relatively absorbent structure.

Likewise, the explosion procedure is advantageous in conjunction with the extraction of the cocoa butter from the nibs when solvents are used as, for instance, carbon bisulphide, alcohol, or other similar solvents or extracting materials. These may be used to produce an even larger yield of the fat.

An unusual procedure in the carrying out of this invention results in the removal of the fat from the cocoa nib while it is in its raw condition, or at least prior to roasting. In other words, it is now possible to remove the cocoa butter from the cocoa nibs prior to their being roasted so that a substantially better quality of cocoa butter is produced because it is not affected by the usual heat and roasting procedure.

This embodiment of this invention is accomplished by exploding the cocoa nibs as herein described, so as to disrupt the structure of the cocoa nib. Then, the cocoa butter is removed therefrom while the cocoa nib still retains its unity. This cocoa nib, following the extraction of the fat therefrom, may then be roasted and ground so as to produce the resulting cocoa, but with a good portion of its fat having been removed therefrom.

This embodiment is accomplished by removing the excess fat that exudes from the cocoa nib following the explosion. The procedures for the removal of the fat may be, for instance, by the use of solvents, by dry-heating the exploded nibs, or by water washings, particularly when the water is of a temperature above the melting point of the cocoa butter. The exuded portion of the butter may be first removed by draining, or by absorbing it off the nibs, and then the fat from the interior portions may be removed by the procedures noted above.

Then, the cocoa nibs may be subjected to an additional one or more explosion procedures, and after each of these explosion procedures the fat may be removed as described above. Each of the explosions permit the additional extraction of fat therefrom.

In these various procedures, the dry heating of the cocoa nibs, following the explosion, is usually quite effective in removing interior portions of the fat, in view of the fact that the heat liquefies the fat and thereby aids in exudation, or in solvent extraction, or in water washing therefrom.

In the carrying out of this particular fat-removing embodiment, even the resulting cocoa is improved because, by the removal of the fat from the nib, a different type of roast is produced, or even, if desired, the temperature of the roast may now be substantially raised and a shorter roasting period thereby used.

In carrying out the explosion procedure of this invention, a further generally preferred procedure is to carry on these explosions in a relatively dry atmosphere, as, for instance, in a chamber in which the steam that is developed, is from the moisture within the cocoa nib itself, rather than from steam or superheated steam that is forced into the pressure chamber. In carrying out this type of explosion, generally higher moisture contents are desirable in the cocoa nibs prior to explosion, as, for instance, between 10% and 15%, or even between 15% and 25%. Also the pressure, time, and temperature variables of this type of explosion operation differ generally as compared with those procedures where steam, or particularly superheated steam, is forced into the chamber. With reference to the time element, for instance, the range of time for exposure to the heat-increased pressure in the pressure chamber may be, for example, from about 5 minutes to 10 minutes as compared with comparable explosions of 15 seconds to 60 seconds under conditions of steam or superheated steam. The moisture content of the nibs may be increased, where this is necessary, by exposure to a damp atmosphere, or by steaming, for instance, or by light boiling, etc.

*Example I*

As an example for the carrying out of this invention cocoa nibs of a moisture content of about 6% to 8% are placed into a pressure chamber and are subjected to a pressure of 80 pounds per square inch at a temperature of 500° F. in a superheated steam atmosphere for a period of about 30 seconds. Immediately thereafter the temperature and pressure is reduced to atmospheric by opening the chamber, whereupon the cocoa nibs will be ejected therefrom.

The cocoa nibs are then placed into a revolving roasting oven and are roasted at a temperature of about 240° F. for a period of 1¼ hours. Normally, for the particular cocoa nibs that were used for this example, an increased temperature of about 280° F., or a time of about 2 hours would be necessary in order to produce the same results.

Immediately after the roast, the cocoa nibs are subjected to an air blast to cool them.

The cocoa nibs are then finely ground so as to eliminate the fat therefrom, and subsequently, the cocoa butter is separated from the powdered cocoa.

In the carrying out of this example, the cocoa nibs may preferably be subjected to a series of 2 or 3 explosions at the same conditions of pressure, time and temperature as noted above, or these conditions may be changed, for example, to 60 pounds per square inch pressure, and to a temperature of 450° F. for this multiple explosion. The use of this multiple explosion procedure will produce an enhanced disruption of the cocoa nibs.

*Example II*

An example of producing cocoa butter from cocoa nibs is to expose the cocoa nibs at a temperature of 500° F. in a superheated steam atmosphere and at a pressure of 100 pounds per square inch for a time period of 15 seconds. The cocoa nibs are then suddenly released to atmospheric temperature and pressure.

Following this procedure the exploded cocoa nibs are given a water washing by being placed into warm water of a temperature of about 130° F. to 140° F., and are allowed to remain therein for a period of 30 minutes with slow agitation being given to the nibs. After each water washing the excess fat is removed from the top surface of the water.

The cocoa nibs are then placed on a screen in a drying oven of a temperature of 120° F. so that a portion of the fat within the nibs will exude therefrom into the pan beneath them and so that, at the same time the nib may become sufficiently dry to enable further explosion.

The explosion treatment is then repeated. Then the water washing treatment is then repeated for 2 more times in the same way as above described, and is followed again by the heat treatment.

The de-fatted cocoa nibs are then dried to a moisture content of about 6% to 10% and they are then roasted and cooled as described above in Example 1.

Following this explosion procedure the cocoa nibs are then ground and any of the remaining fat is removed therefrom, and likewise, the powdered cocoa is removed therefrom.

In the removal of the fat from the exploded nibs, instead of placing them into hot water, or even along with this procedure, an additional procedure of treating the nibs with a solvent so as to extract the fat therefrom while the nibs are in their relatively unified condition may be utilized.

The material that remains following the roasting and cooling process may be ground with hot water, preferably, or with hot liquid oil, of a temperature of about 145° F. to 150° F., in order to enhance the extraction or expression of the fat therefrom. In effecting pressure methods, a pressure of 2000 to 3000 pounds per square inch, for example, may be used.

*Example III*

A further example for producing the products of this invention is to treat the cocoa nibs as outlined in Example I, except, after the cocoa nibs have been roasted and cooled as described in Example I, they are again subjected to an explosion procedure at a temperature of 450° F., and at a pressure of 60 pounds per square inch, for a period of 15 seconds. Following this repeated explosion, the exploded nibs may then be ground as described in Example I, or, for further structure disruption, the cocoa nibs may be placed back into the pressure chamber and given still another explosion treatment at the same temperature, pressure, and time limit as outlined herein. Following this procedure the nibs may then be ground and treated so as to separate the fat and the cocoa.

*Example IV*

As an alternative, and as one of the generally preferred explosion procedures, the first explosion procedure of Example I may be carried out without the use of a superheated steam atmosphere, and without the forcing of superheated steam into the pressure chamber.

For example, in the first explosion of Example I the cocoa nibs may be tempered, or otherwise made to absorb moisture so as to result in the nib containing a moisture content of about 15% to 20%. In this condition the nibs are placed into the explosion chamber which is then hermetically sealed. Air, or preferably an inert gas such as nitrogen, is forced into the chamber so as to bring the pressure up to about 10 pounds. The chamber is then rotated while heat is applied until a pressure of about 125 pounds is developed over a period of about 7 or 8 minutes. At this point the chamber is suddenly opened so as to instantaneously release the cocoa nibs to atmospheric temperature and pressure.

The multiple explosion of Example I may likewise be of the same temperature, pressure and time conditions, or, the pressure of this multiple explosion may be, for example, about 90 or 100 pounds per square inch instead of the 125 pounds used for the first explosion.

*Example V*

As a still further illustration of the explosion procedure where steam, or particularly superheated steam, is not forced into the pressure chamber from without, the explosion procedure of Example II, and even the explosion procedures of Example I, may be effected by exposing the cocoa nibs to humid air, or to a steaming, or to a similar water-absorbent operation, if this is necessary, in order to bring the moisture content of the cocoa nibs up to about 15% to 18%.

These nibs are then placed into the pressure chamber to the extent of possibly one-half of the capacity of the chamber, and this chamber is then tightly sealed with the closing lid.

Nitrogen, or compressed air, for instance, is forced into the chamber so as to raise the pressure to about 10 pounds per square inch. Then, while rotating the chamber, heat is applied so that the pressure reaches a range of between about 150 and 160 pounds per square inch. This should be adjusted so that this pressure is reached in 6 or 7 minutes. Thereafter the pressure is instantaneously reduced by opening the closed lid so as to reduce the temperature and pressure to atmospheric.

As a still further alternative of this procedure, it is not necessary, although in many cases it is generally preferred, to begin the pressure by the forcing of the compressed air or nitrogen into the chamber prior to the raising of the pressure by heating. On the other hand, however, the pressure of the compressed air may be of about 20 to 30 pounds, etc., before the heat treatment is effected.

The explosion procedures, when more than one is used in effecting the complete treatment to the nib, may be intermingled so as to have these individual explosions consist of the same or combinations of various types of explosion procedures which may be for example, of the type where steam is forced in from the outside, or where superheated steam is used, or where neither steam nor superheated steam is forced into the chamber from without.

By the term "cocoa nib" or "cocoa nibs" in the specification is meant "cacao nib" or "cacao nibs," which terms may be used synonymously.

What I claim is:

1. The method of producing an enhanced cocoa nib, said method comprising subjecting the cocoa nib to an elevated temperature and an elevated gas pressure and thereafter suddenly releasing the nib to a lower temperature and pressure, and then roasting the nib.

2. The method of producing a substantially improved cocoa, said method comprising subjecting cocoa nibs to an elevated temperature and an elevated gas pressure and thereafter suddenly releasing the nibs to a lower temperature and pressure, and then roasting the nib, and then grinding the exploded cocoa nib.

3. The method of producing a substantially improved quality cocoa butter, said method comprising subjecting the cocoa nib to an elevated temperature and an elevated gas pressure and thereafter suddenly releasing the nib to a lower temperature and pressure, and thereafter removing the fat therefrom.

4. The method of producing an enhanced cocoa nib, said method comprising subjecting the cocoa nib to an elevated temperature and an elevated gas pressure and thereafter suddenly releasing the nib to a lower temperature and pressure, then roasting the nib, and then subjecting the nib again to an elevated temperature and pressure followed by suddenly releasing it to a lower temperature and pressure.

ALBERT MUSHER.